July 31, 1923.   1,463,655
A. F. MASURY ET AL
CUSHION CONNECTION FOR VEHICLE SPRINGS
Filed June 1, 1922
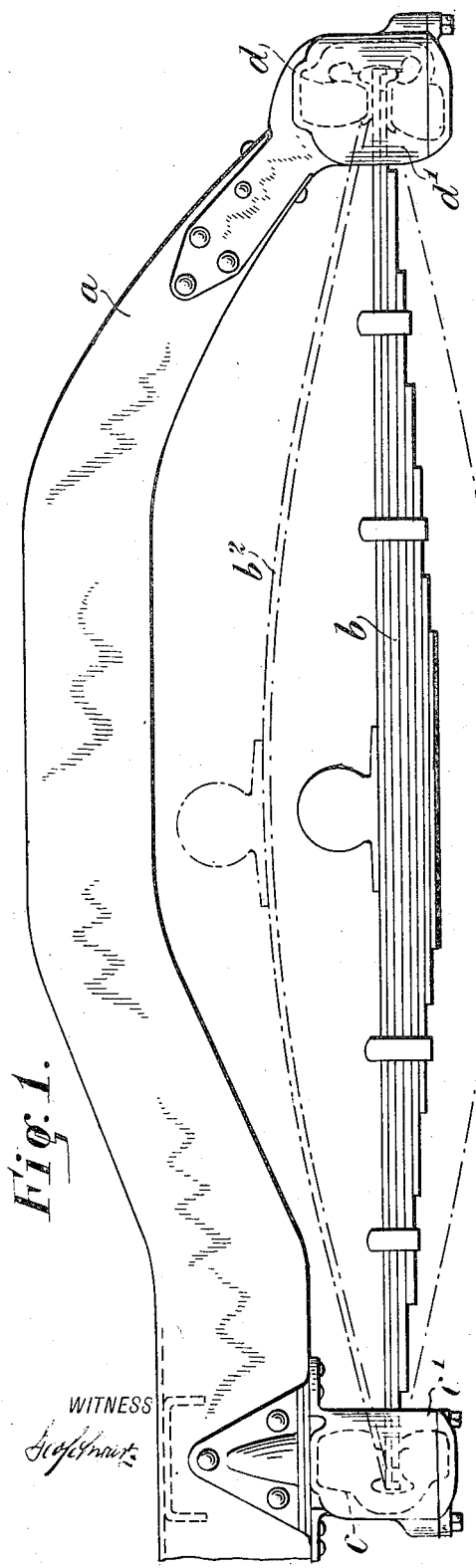
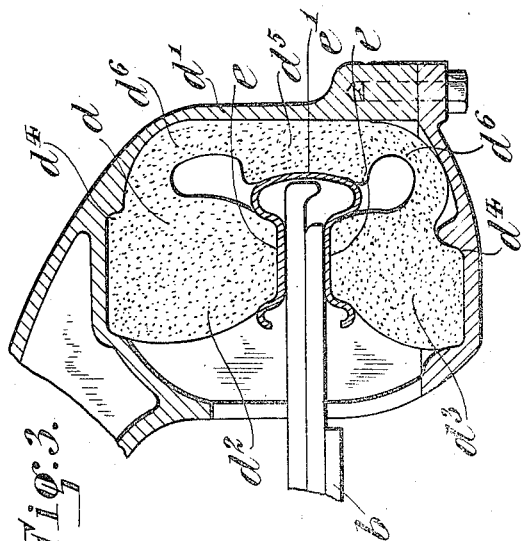
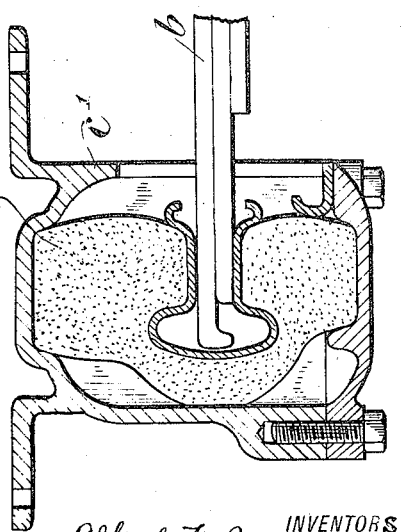
INVENTORS
Alfred F. Masury and
August H. Leipert
BY
Redding & Greeley
ATTORNEYS Patented July 31, 1923.

1,463,655

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

CUSHION CONNECTION FOR VEHICLE SPRINGS.

Application filed June 1, 1922. Serial No. 565,069.

*To all whom it may concern:*

Be it known that we, ALFRED F. MASURY and AUGUST H. LEIPERT, citizens of the United States, and residents, respectively, of the borough of Manhattan and of the borough of Queens, of the city of New York, in the State of New York, pray that Letters Patent of the United States may be granted to us for new and useful Improvements in Cushion Connections for Vehicle Springs, of which the following is a specification, reference being had to the accompanying drawings, forming a part hereof.

This invention relates to cushion connections of the character described and claimed in Letters Patent of the United States No. 1,404,876 in which a wholly non-metallic mechanical connection and support is interposed between an end of a vehicle spring and the frame. The present invention is concerned with a particular application of the invention claimed broadly in said Patent No. 1,404,876 and will find its greatest usefulness in association with vehicle springs having relatively great deflection. The invention is not to be limited, however, to any particular application although as described with reference to the illustrated embodiment it will be understood that it is intended primarily to take care of the condition found on the rear springs of motor vehicles and particularly pleasure passenger cars, where the spring deflection is so great that the spring actually bends from convex form to concave form through a median position of maximum elongation.

In accordance with the present invention it is proposed to retain all of the advantages characteristic of cushion connections of the type disclosed in said Patent No. 1,404,876 in so far as concerns the non-metallic and resilient properties of the connection and, in addition, provide for a suspension wherein maximum elongation of the spring is permitted without requiring the cushion connections to compensate for such elongation through compression. For instance, in pleasure cars it is not unusual for the maximum deflection of the rear springs to exceed six inches. Where the ends of the springs are confined by cushion connections of the improved character shown in Patent No. 1,404,876 such elongation might require deformation of the resilient connections to a corresponding degree. Such confinement of the spring even though effected through yielding means results in a tendency to over-stress it and the deformation of the resilient blocks likewise results in the storing up of energy, the accumulative action of the stressed spring and the compressed blocks being, when the spring passes through its median position, to give it a very quick or snap action which is undesirable.

The present improvements eliminate the danger of over-stressing the spring and over-compressing the blocks in the manner described by providing for relatively free elongation of the spring at one end. In the Hotchkiss drive, for instance, it is proposed to confine the front end of each rear spring within a cushion connection while leaving the rear end relatively free for all elongation. To this end, the cushion connection for the rear end of the spring is made of either different dimensions or different form, or both, from the cushion connection in the front end, or is mounted in different relation to the end of the spring.

Reference is now to be had to the accompanying drawings for a detailed description of the preferred embodiment of the invention, in which:

Figure 1 is a view showing the rear end of one of the side frame members of a motor vehicle to which is connected the rear spring through cushion connections different positions of the spring under different loads being indicated by dotted lines.

Figures 2 and 3 are detailed views in vertical section at the front and rear ends, respectively, of the spring shown in Figure 1.

As indicated hereinbefore, and as will be more apparent as the description proceeds, the present improvements are not to be limited in their application to the rear springs of a motor vehicle nor to the Hotchkiss type of drive but it is believed that the widest usefulness will be found in such an application. Further, it is to be understood that the drawings are of very conventional character and are intended merely to illustrate, in diagrammatic manner, the principle underlying the improvements. The side frame member *a* is supported on and connected to the spring *b* by the cushion elements *c, d*, disposed, respectively, at the front and rear ends of the spring $b$, these elements being confined within suitable housings $c'$, $d'$, respectively, secured to the frame all in general accordance with the construction disclosed in Patent No. 1,404,876. Where the spring $b$ has a relatively large deflection as indicated by the concave and convex dotted lines $b'$, $b^2$, respectively, in Figure 1, it is apparent that if the ends of the spring are confined by the blocks $c$, $d$, the spring will be greatly stressed at its median position (shown in full lines in Figure 1) and the blocks themselves will be deformed to such an extent as to place them under great compression. The energy thus stored up will, of course, be expended by the spring and the blocks at the instant the spring passes through its median position and this will cause an undesirable quick or snap action of the spring. In accordance with the present improvements it is proposed to avoid this condition by leaving the spring a considerable degree of freedom at one end so that all of its elongation, if any, need not be compensated for by deformation of the blocks to a corresponding degree. At the same time, it has been found desirable to retain the cushioning effect of these blocks to some degree so in the preferred form one or both of these blocks may be placed under some degree of compression either in all, or in predetermined positions of the spring. When the improved suspension is incorporated in the Hotchkiss type of drive it is proposed to confine the front end of the spring $b$ by the block $c$ so that driving forces transmitted through the spring will always be applied directly to the block and through it to the frame. The rear end of the spring, however, is mounted in a block which is of such form, or such dimensions, or in such relation to the spring that a considerable degree of freedom is afforded for elongation. In the type of block shown in Figure 3 a considerable mass of material is interposed between the upper and lower sides of the spring and the walls of the housing, such masses being indicated at $d^2$ and $d^3$, respectively. These sections of the block may be seated on metal seats $e$ provided therefor on the spring and may also be seated in the housing $d'$ in specially prepared seats $d^4$. Between the rear wall of the housing $d'$ and the end of the spring may also be interposed a relatively great mass of yielding material this section being indicated at $d^5$. If desired, instead of exposing this section $d^5$ for direct engagement by the end of the spring the spring may have secured thereto a specially formed seat $e'$ for engagement with the section $d^5$, this seat, in the illustrated embodiment, being formed with the seats $e$ for the other sections $d^2$, $d^3$ of the cushion connection. For manufacturing and mechanical considerations it is proposed to mould the sections $d^2$, $d^3$, $d^5$ in a unitary block, the sections $d^2$ and $d^3$ being united with the section $d^5$ through relatively thin or weakened sections $d^6$ whereby free flexion of the sections $d^2$, $d^3$, with respect to the housing and with respect to the section $d^5$ is permitted.

The connection of the spring at its front end to the frame may be generally similar to that illustrated in Patent No. 1,400,563 dated December 20, 1921, the invention not being limited to the character of this connection, except that it is proposed to have the front end of the spring relatively but not absolutely fixed with relation to the frame while the rear end of the spring may move with some degree of freedom relatively thereto.

The improved suspension insures the transmission of driving forces through the spring to the frame by means of the cushion connection $c$. Upon deflection of the spring and elongation thereof some freedom of movement will be afforded at its rear end through the flexion of the sections $d^2$, $d^3$, and the material in line with the ends of the spring will be compressed to some degree but not to an objectionable degree while the spring itself will not be over-stressed in effecting this degree of deformation of the material of the cushion connections. Accordingly, when the spring passes through its median position it will not be subject to a snap or quick action such as would be objectionable although the non-metallic yielding connections between its ends and the frame will always function in accordance with the principles underlying the construction disclosed by Patent No. 1,404,876.

Aside from the latitude in matters of design indicated hereinbefore it is to be understood that the precise form and dimensions of the cushion connections employed may be changed as thought desirable. Further, instead of having unitary blocks at the opposite ends of the spring it is evident that the same results might be obtained by providing a plurality of separately formed blocks so disposed as to accomplish the ends sought.

What we claim is:

1. In combination with the spring and frame of a motor vehicle, a wholly non-metallic mechanical connection and support interposed between one end of the spring and the frame and comprising a block of non-metallic yielding material engaged with the end of the spring and means secured to the frame and holding the end relatively fixed, within limits, with respect to the frame, and a wholly non-metallic support interposed between the other end of the spring and the frame and comprising a block of non-metallic yielding material engaged with the end of the spring, and means to secure the block to the frame, said block affording free elongation of the spring.

2. In combination with the rear spring and frame of a motor vehicle, a wholly non-metallic mechanical connection and support interposed between the front end of the spring and the frame and comprising a block of non-metallic yielding material engaged with the end of the spring, a housing for the block secured to the frame and holding the block against relative movement, within limits, with respect to the frame, and means to connect the rear end of the spring to the frame with capacity for relative movement therebetween.

3. In combination with the spring and frame of a motor vehicle, a wholly non-metallic mechanical connection and support interposed between an end of the spring and the frame and comprising a block of non-metallic yielding material engaged with the end of the spring, a housing for the block secured to the frame and confining the block to hold it against displacement with respect to the frame and to hold the end of the spring against relative movement, within limits, with respect to the frame, a wholly non-metallic support interposed between the other end of the spring and the frame and comprising sections of non-metallic yielding material engaged with the end of the spring, means to secure said sections to the frame and hold them against displacement with respect thereto, said sections being flexible to permit relatively free movement of the end of the spring with respect to the frame, and means to oppose yieldingly elongation of the spring when in certain positions.

4. In combination with the spring and frame of a motor vehicle, a wholly non-metallic mechanical connection and support interposed between an end of the spring and the frame and comprising a block of non-metallic yielding material engaged with the end of the spring, a housing for the block secured to the frame and confining the block to hold it against displacement with respect to the frame and to hold the end of the spring against relative movement, within limits, with respect to the frame, a wholly non-metallic support interposed between the other end of the spring and the frame and comprising sections of non-metallic yielding material engaged with the end of the spring, a housing to secure said sections to the frame and hold them against displacement with respect thereto, said sections being flexible to permit relatively free movement of the end of the spring with respect to the frame, and a non-metallic section of yielding material interposed between the last named end of the spring and said housing to oppose yieldingly elongation of the spring in certain positions.

5. In combination with the rear spring and frame of a motor vehicle, a wholly non-metallic mechanical connection and support interposed between the front end of the spring and the frame and including a section of non-metallic yielding material disposed at the end of the spring to receive driving forces therefrom, means to secure said section to the frame of the vehicle, whereby the front end of the spring is held yieldingly against relative movement with respect to the frame, within limits, and means to connect the rear end of the spring to the frame with capacity for relatively free movement with respect to the frame.

6. An article of manufacture comprising a unitary block of yielding material adapted to be supported on the frame of a motor vehicle and having a recess to receive the end of a spring and formed with opposed sections engaging the upper and lower sides of the spring respectively and adapted to flex freely upon elongation of the spring.

7. As an article of manufacture a unitary block of yielding material adapted to be supported on the frame of a motor vehicle and having upper and lower sections adapted to engage the opposite faces of the spring and flex freely upon elongation thereof and having a third section adapted to be engaged by the end of the spring to oppose yieldingly elongation thereof.

This specification signed this 26 day of May, A. D. 1922.

ALFRED F. MASURY.
AUGUST H. LEIPERT.